Figure 1:
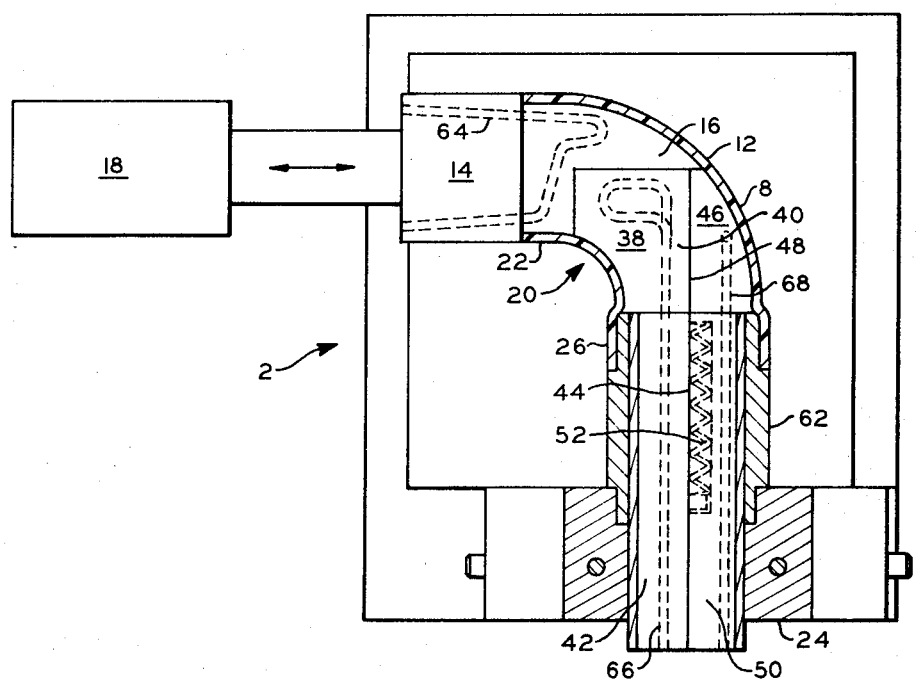

United States Patent [19]
Deutsch

[11] 3,752,436
[45] Aug. 14, 1973

[54] APPARATUS FOR MOLDING ARTICLES HAVING A NONLINEAR CHAMBER

[75] Inventor: Peter R. Deutsch, Titusville, Pa.

[73] Assignee: Phillips Petroleum Company, Bartlesville, Okla.

[22] Filed: Sept. 28, 1972

[21] Appl. No.: 292,900

Related U.S. Application Data

[62] Division of Ser. No. 99,847, Dec. 21, 1970, Pat. No. 3,711,590.

[52] U.S. Cl..................... 249/145, 249/64, 249/185
[51] Int. Cl. .............................................. B22c 9/24
[58] Field of Search................... 249/145, 144, 151, 249/117, 63, 64, 185; 425/306

[56] References Cited
UNITED STATES PATENTS 3,545,718   12/1970   Shale ................................. 249/185
1,097,849   5/1914    Custer............................... 249/145

*Primary Examiner*—J. Spencer Overholser
*Assistant Examiner*—DeWalden W. Jones
*Attorney*—Quigg & Oberlin

[57] ABSTRACT

A first molding core is positioned within a first portion of a separable mold having a nonlinear chamber. A second molding core having an end matable with the end of the first core is inserted within a second end portion of the chamber of the mold adjacent and in slidable contact with a third molding core. The first molding core is retractable from the mold and the second and third molding cores are pivotally connected to one of the mold sections for removing the molded article and the second and third molding cores from the mold section. The third molding core is slidable along the second molding core for releasing the article from the second and third molding cores.

8 Claims, 3 Drawing Figures

PATENTED AUG 14 1973    3,752,436

APPARATUS FOR MOLDING ARTICLES HAVING A NONLINEAR CHAMBER

This application is a divisional of my copending application Ser. No. 099,847, filed Dec. 21, 1970, now U.S. Pat. No. 3,711,590.

It is desirable to provide an apparatus and method for molding articles having a nonlinear chamber extending therethrough and providing means for more easily removing the molded article from the molding core. Heretofore utilized molding apparatus for molding an article of the above-described type required relatively large expenditure of time for removing the cores from the article and was sometimes dangerous.

Objects of this invention are to provide a molding apparatus and method for molding an article of the above-described type which requires a decreased cycle time, is less dangerous, and is more efficient.

The invention is a unique apparatus and method for molding articles of the above-described type whereby at least a portion of the cores are pivotally movable for separating the article and cores fro the mold and slidably movable relative one to the other for ejecting the molded article from the cores.

Other aspects, objects, and advantages of the present invention will become apparent from a study of the disclosure, the appended claims, and the drawing.

Figures 2, 3:
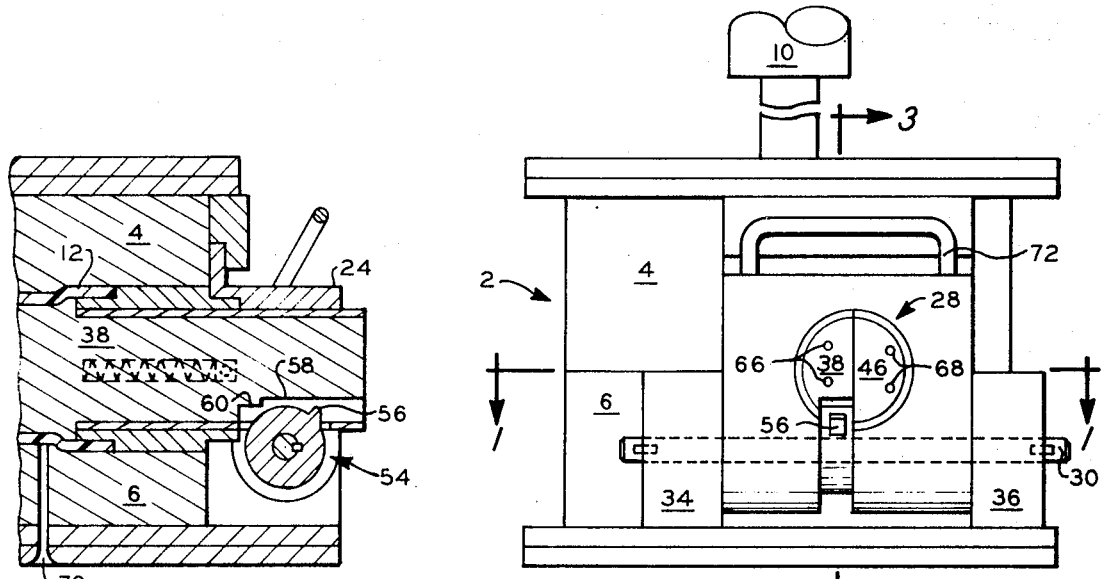

The drawings are diagrammatic views in partial section of the apparatus of this invention. FIG. 1 shows a plan view, in partial section, of the molding cores, the second mold section, and the hinge block; FIG. 2 shows a frontal view of the hinge block and associated apparatus; and FIG. 3 shows a side view of the hinge block, stop lug, second molding core, and mold sections in partial section.

Referring to FIGS. 1 and 2, an injection mold 2 is formed of first and second mold sections 4,6 each having a nonlinear cavity 8. The first mold section 4 is movable relative to the second mold section 6 by, for example, a hydraulic cylinder 10 attached thereto, between a first position (shown in FIG. 2) at which the mold sections 4,6 are aligned and suitably contacting one another forming a nonlinear mold chamber therethrough and a second position at which the first section 4 is spaced from the second section for removing a molded article 12 from the mold 2.

A first molding core 14 has an end 16 and is movable by, for example, a separate hydraulic cylinder 18 between a first position at which the first molding core 14 is spaced from a first end portion 22 of the mold chamber 20 and a second position (as shown in FIG. 1) at which the first molding core 14 is positioned within the first end portion 22 of the mold chamber 20.

Referring to FIGS. 2 and 3, a hinge block is positioned adjacent a second end portion 26 of the mold chamber 20. The hinge block 24 has an opening 28 extending therethrough. The hinge block 24 is pivotally attached to a fixed shaft 30 that is, for example, fixedly attached to the second mold section 6 through the associated mold support plate 32 and support blocks 34,36. The hinge block is pivotally movable relative to the mold 2 between a first position (shown) at which the opening 28 is axially aligned with the second end portion 26 of the chamber 20 and a second position at which the axis of the opening 28 is angularly disposed in a direction away from the cavity 8 of the second mold section.

A second molding core 38 has a first end portion that is matable with the end 16 of the molding core 14 and is slidably mounted within a second end portion 42 thereof within the opening 28 of the hinge block 24. The second molding core 38 also has a bearing surface 44 extending along the length thereof. The second molding core is movable in response to movement of the hinge block 24 between a first position (shown) at which the second molding core 38 is within the second end portion 26 of the mold chamber 20 and a second position at which the second molding core 38 is located a distance spaced from the second mold section 6. At the second position of the first molding core 14 and the first position of the second molding core 38, the end 16 of the first molding core 14 and the first end portion 40 of the second molding core 38 are in forcible contact one against the other.

A third molding core 46 has a bearing surface 48 extending along the length thereof in slidable contact with the bearing surface 44 of the second molding core 38. The third molding core 46 also has an end portion 50 extending through the opening 28 of the hinge block 24 and is fixedly attached thereto and movable thereby between a first position (shown) at which the third molding core 46 is within the second end portion 22 of the mold chamber 20 and a second position at which the third molding core 46 is located a distance spaced from the second mold section 6 and a distance along the second molding core 38 in a direction toward the hinge block 24. A spring 52 is preferably mounted in contact with the second and third molding cores 38,46 urging the third molding core 46 toward the first end portion of the second molding core 38. The spring 52 is also compressible for movement of the third molding core 46 from the first to the second position. Means other than the spring 52 can be utilized, but a spring is preferred in order that the apparatus can be easily constructed and maintained.

A holding means 54 is associated with the hinge block 24 and the second molding core 38 for contacting the second end portion 42 of the second molding core 38 at the second position thereof and maintaining it at the second position during further movement of the hinge block 24 toward its second position.

One construction of the holding means 54 is, for example, providing a stop lug 56 fixedly attached at the second section 6 of the mold 2 with said stop lug 56 being matable at the second position of the second molding core 38 with a slot 58 formed on a lower portion 60 of the second end portion 42 of the second molding core 38. Other construction of the holding means 54 can be utilized but the stop lug-slot 56,58 is preferred in order to simplify construction of the apparatus.

Where it is desirable to form a molded article 12 having a bell end at the second end portion 26 of the mold chamber 20, a fourth molding core 62 can be utilized. That fourth molding core is of a ring configuration and encompasses a portion of the outer periphery of the second and third molding cores 38,46. The fourth molding core 62 is, for example, fixedly attached to the third molding core 46 and slidably mounted along the second molding core 38 in response to movement of the third molding core 46. The fourth molding core 62 can also be fixedly attached to the hinge block in order to increase the stability of said core and can be of other construction so long as the third and fourth cores 46,62 move simultaneously with the hinge block 24.

At least one fluid passageway 64, for example, can be formed through a core. Preferably, a plurality of molding cores 14,38,46, for example, have separate fluid passageways 64,66,68 for passage of fluid therethrough and cooling the cores and the contacting molding material.

As known in the art, the material which is injected into the mold 2 for forming the molded article 12 can be any of a multiplicity of plastics or other materials which can be injected through a sprue 70 into the mold chamber 20 by conventional means. As also known in the art, the molding core 14,38,46 and 62 are positioned within the mold chamber 20 spaced from the walls of the chamber a distance substantially corresponding to the thickness of the article 12 formed by the apparatus of this invention.

It should be understood that for simplicity, an ell having one bell end has been shown as the molded article 12 for example purposes. Other articles of other configuration can be formed by the apparatus and method of this invention by providing additional core elements of types corresponding to the first molding core 14 and/or the second, third and fourth molding cores 38,46,62. In such a construction, the mold chamber 20 also is of different construction for receiving the additional core elements. In addition to forming articles of ell configuration, tees, crosses, 45° ells and others, the apparatus can also be used to construct a block type structure having a plurality of interconnecting, linear, nonlinear, and/or nonconnecting chambers therein and therethrough. One skilled in the art can easily determine the core construction of this invention necesaary for the particular type article desired. It is important, however, that one second and third molding composite core 38,46 and hinge block 24 arrangement be provided in order that the article can be removed from the mold 2 and ejected from the cores as described herein.

In the operation of the apparatus of this invention, a separable mold 2 having a nonlinear chamber 20 formed therethrough with a sprue 70 opening into said chamber is provided. In the start-up position, the first molding core 14 is inserted into the first end portion 22 of the mold chamber 20 and the second, third, and if applicable, the fourth molding cores 38,46,62 are inserted into the second end portion 26 of the mold chamber 20 with the end 16 of the first molding core 14 sealably connecting the first end portion 40 of the second molding core 38. The mold chamber 20 is thereby sealed with the cores extending therethrough. Molding material is thereafter injected into the annulus formed between the cores and the walls of the mold chamber for forming the molded article about the cores. Fluid can be passed through the fluid passageways 64,66,68 where it is desirable to more rapidly set the molding material.

After the molding material has sufficiently set to permit withdrawal of the molded article without damage thereto, the hydraulic cylinder 10, for example, is actuated for moving the first molding core 14 from the second to the first position. The first mold section 4 is moved by the hydraulic cylinder 18, for example, from the first to the second position for opening the mold 2.

The operator thereafter grasps the handle 72 of the hinge block 24 and pivots the hinge block 24 about the shaft 30 downwardly and outwardly from the mold section 6 from the first to the second position.

During initial movement of the hinge block from the first to the second position, the second and third molding cores 38,46 and the article 12 are simultaneously pivoted about the shaft 30 for moving said cores 38,46 and article 12 upwardly and laterally from the second mold section 6 of the mold 2 to a location spaced from the second mold section 6. The article 12 and cores 38,46 are thereafter stripped from the mold section 6 and the second molding core 38 is at its second position at which the holding means 54 is maintaining said core 38 against further movement by the hinge block 24.

The hinge block 24 continues in its pivotal pathway to the second position. During this further movement of the hinge block 24, the third and fourth molding cores 46,62 are moved relative to the second molding core 38 and the molded article which is being maintained by the first end portion 40 of the second molding core 38 thereby releasing the article from the third and fourth molding cores 46,62. At the second position of the hinge block 24 the third and fourth molding cores 46,62 are at their second positions thereby sufficiently clearing the mold chamber 20 for removing of the article from the cores.

The hinge block 24 can then be returned to the first position which moves the second, third, and fourth molding cores 42,46,62 into the mold cavity and the first molding core 14 is returned to its second position for initiation of a new cycle.

By the method of this invention, it is possible to release the molded article from the mold and cores without requiring an operator to place his hands between the mold sections which could result in damage to his hands where the apparatus malfunctions and the mold sections accidentally move to their first position. The construction and method of the apparatus of this invention also permits a shorter cycle time and the forming of articles of improved quality.

Other modifications and alterations of this invention will become apparent to those skilled in the art from the foregoing discussion and accompanying drawing, and it should be understood that this invention is not to be unduly limited thereto.

What is claimed is:

1. An apparatus for injection molding articles having at least one nonlinear chamber formed therethrough, comprising:

a mold having first and second sections each having a nonlinear cavity, said first section being movable relative to the second section between a first position at which the sections are aligned and sealably contacting one another forming a nonlinear mold chamber therethrough and a second position at which the first section is spaced from the second section for removing a molded article from the mold;

a first molding core having an end and being movable between a first position at which said first molding core is spaced from a first end portion of the mold chamber and a second position at which the first molding core is positioned within the first end portion of the mold chamber;

a hinge block positioned adjacent a second end portion of the mold chamber, said hinge block having an opening extending therethrough and being pivotally movable relative to the mold between a first position at which the opening is axially aligned with the second end portion of the mold chamber and a second position at which the axis of the opening is angularly disposed from the cavity of the second mold section;

a second molding core having a first end portion matable with the end of the first molding core, a second end portion slidably mounted within the opening of the hinge block, and a bearing surface extending along the length thereof, said second molding core being movable in response to movement of the hinge block between a first position at which the second molding core is within the second end portion of the mold chamber and a second position at which the second molding core is located a distance spaced from the second section of the mold;

a third molding core having a bearing surface extending along the length thereof in contact with the bearing surface of the second molding core and slidably movable relative thereto and an end portion extending through the opening of the hinge block and fixedly attached thereto, said third molding core being movable in response to movement of the hinge block between a first position at which the third molding core is within the second end portion of the mold chamber and a second position at which the third molding core is located a distance spaced from the second section of the mold and a distance along the second molding core toward the hinge block; and holding means associated with the hinge block and the second molding core for contacting the second end portion of the second molding core at the second position thereof and maintaining said core at the second position during further movement of the hinge block toward its second position.

2. An apparatus, as set forth in claim 1, wherein the holding means comprises a stop lug fixedly attached at the second section of the mold and being matable at the second position of the second molding core with a slot formed on a lower portion of the second end portion of the second molding core.

3. An apparatus, as set forth in claim 2, wherein the stop lug is fixedly attached to the second section of the mold through a shaft and the hinge block is pivotally attached to the shaft.

4. An apparatus, as set forth in claim 1, wherein at least one of the molding cores has a fluid passageway for cooling said core.

5. An apparatus, as set forth in claim 1, wherein a plurality of the molding cores have separate fluid passageways for cooling said cores.

6. An apparatus, as set forth in claim 1, including a spring being in contact with the second and third molding cores urging the third molding core toward the first end of the second molding core and being compressible for movement of the third molding core from the first to the second position.

7. An apparatus, as set forth in claim 1, including a hydraulic cylinder connected to the first molding core and a hydraulic cylinder connected to the first section of the mold for moving the first molding core and the first section of the mold between their first and second positions.

8. An apparatus, as set forth in claim 1, including a fourth molding core encompassing a portion of the outer periphery of the second and third molding cores, said fourth molding core being fixedly attached to the third molding core and slidably mounted about the second molding core for movement along the second molding core in response to movement of the third molding core for forming an article having an enlarged end portion and ejecting said article.

* * * * *